(12) United States Patent
Satou

(10) Patent No.: US 8,420,220 B2
(45) Date of Patent: Apr. 16, 2013

(54) RUBBER COMPOSITION

(75) Inventor: Yoshitaka Satou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 76 days.

(21) Appl. No.: 12/920,792

(22) PCT Filed: Mar. 4, 2009

(86) PCT No.: PCT/JP2009/054059
§ 371 (c)(1),
(2), (4) Date: Sep. 2, 2010

(87) PCT Pub. No.: WO2009/110501
PCT Pub. Date: Sep. 11, 2009

(65) Prior Publication Data
US 2011/0021674 A1    Jan. 27, 2011

(30) Foreign Application Priority Data

Mar. 5, 2008 (JP) ................................. 2008-055206
Jun. 24, 2008 (JP) ................................. 2008-164620

(51) Int. Cl.
*B32B 15/16* (2006.01)
*C08C 19/20* (2006.01)
*C08K 3/06* (2006.01)
*C08K 3/10* (2006.01)

(52) U.S. Cl.
USPC ........... 428/462; 428/461; 428/465; 428/500; 524/572; 524/575.5; 524/576; 524/83; 525/331.9; 525/332.5; 525/332.6; 525/332.7; 525/333.1; 525/333.2; 525/343; 525/349; 525/354

(58) Field of Classification Search ............... 525/332.7, 525/349, 331.9, 332.5, 332.6, 333.1, 333.2, 525/343, 354; 428/461, 462, 465, 500; 524/572, 524/575.5, 576, 83
See application file for complete search history.

(56) References Cited

U.S. PATENT DOCUMENTS

| | | | |
|---|---|---|---|
| 3,658,828 A | 4/1972 | D'Amico | |
| 5,840,908 A * | 11/1998 | Singh et al. | 548/167 |
| 2009/0151838 A1 * | 6/2009 | Sandstrom et al. | 152/451 |

FOREIGN PATENT DOCUMENTS

| | | |
|---|---|---|
| CS | 176039 | 1/1979 |
| CS | 176040 | 1/1979 |
| EP | 0314663 A1 | 5/1989 |
| EP | 1352923 A1 | 10/2003 |
| EP | 2072282 A1 | 6/2009 |
| FR | 2037001 A | 12/1970 |
| GB | 1177790 | 1/1970 |
| JP | 45-23022 A | 8/1970 |
| JP | 48-11214 A | 4/1973 |
| JP | 58-139803 A | 8/1983 |
| JP | 63-178148 A | 7/1988 |
| JP | 2005-139082 A | 6/2005 |
| JP | 2005-139239 A | 6/2005 |
| JP | 2008-156433 A | 7/2008 |
| JP | 2009-051897 A | 3/2009 |
| WO | 95/30665 A1 | 11/1995 |

OTHER PUBLICATIONS

Extended European Search Report issued Dec. 19, 2011 in European Patent Application No. 09716873.6.
Partial English translation of Japanese Office Action issued in JP Application No. 2010-501933 dated Nov. 6, 2012.
Tibor Gogh et al., Relations between the structure and vulcanization characteristics of N-substituted 2-benzothiazolesulfenamides, Plasty a Kaucuk 1989, 26/10, 301-307.

* cited by examiner

*Primary Examiner* — Roberto Rabago
(74) *Attorney, Agent, or Firm* — Sughrue Mion, PLLC

(57) ABSTRACT

A rubber composition comprising 0.3 to 10 parts by mass of sulfur and 0.1 to 10 parts by mass of a sulfeneamide base vulcanization accelerator represented by the following Formula (I) based on 100 parts by mass of a rubber component:

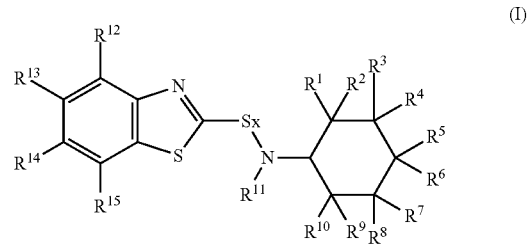

(I)

(wherein $R^1$ to $R^{10}$ are a hydrogen atom, a linear alkyl group having 1 to 4 carbon atoms or a branched alkyl group having 3 to 4 carbon atoms, and they may be the same or different; $R^{11}$ is a hydrogen atom, a linear alkyl group having 1 to 10 carbon atoms or a branched alkyl group having 3 to 10 carbon atoms; $R^{12}$ to $R^{15}$ are a hydrogen atom, a linear alkyl group or alkoxy group having 1 to 4 carbon atoms or a branched alkyl group or alkoxy group having 3 to 4 carbon atoms, and they may be the same or different; and x represents an integer of 1 or 2).

9 Claims, No Drawings

RUBBER COMPOSITION

CROSS REFERENCE TO RELATED APPLICATIONS

This application is a National Stage of International Application No. PCT/JP2009/054059 filed Mar. 4, 2009, claiming priority based on Japanese Patent Application No. 2008-0055206 filed Mar. 5, 2008 and Japanese Patent Application No. 2008-164620 filed Jun. 24, 2008, the contents of all of which are incorporated herein by reference in their entirety.

TECHNICAL FIELD

The present invention relates to a rubber composition containing a specific sulfeneamide base vulcanization accelerator, particularly to a rubber composition which is excellent in adhesion durability with metal reinforcing materials such as steel cords and the like used for rubber products such as tires, industrial belts.

BACKGROUND ART

Composite materials prepared by coating metal reinforcing materials such as steel cords with rubber compositions for the purpose of reinforcing rubbers to enhance strength and durability thereof have so far been used for rubber products to which strength is particularly required such as tires for cars, conveyor belts, hoses and the like.

Adhesion which is stable and less changed with the passage of time is required between the rubbers and the metal reinforcing materials in order to allow the above rubber-metal composite materials to exert a high reinforcing effect and obtain reliability.

Further, when rubber is adhered to metal, a method in which the rubber and the metal are bonded at the same time, that is, a direct vulcanization bonding method is known, and in this case, it is considered to be useful that a sulfeneamide base vulcanization accelerator which provides vulcanization reaction with delayed action is used when vulcanization of the rubber and bonding of the rubber and the metal are carried out at the same time.

At present, N,N-dicyclohexyl-2-benzothiazolylsulfeneamide (hereinafter abbreviated as "DCBS") represented by the following formula is known as a vulcanization accelerator which provides vulcanization reaction with the largest delayed action among commercially available sulfeneamide base vulcanization accelerators:

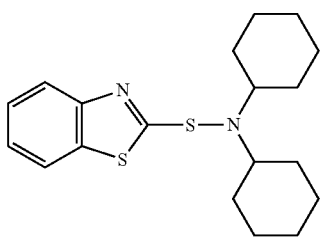 [SMILES: c1ccc2sc(SN(C3CCCCC3)C3CCCCC3)nc2c1]

Further, when a larger delayed action than that in vulcanization reaction of DCBS is required, a vulcanization retardant other than a sulfeneamide base vulcanization accelerator is used in combination. N-(cyclohexylthio)phthalimide (hereinafter abbreviated as "CTP") is known as a representative vulcanization retardant which is commercially available, but it has already been known that if this CTP is compounded with rubber in a large amount, it exerts an adverse effect on the physical properties of the vulcanized rubber and that it causes blooming which deteriorates the appearance of the vulcanized rubber and exerts an adverse effect on an adhesive property thereof.

Further, bissulfeneamides represented by a specific formula (patent document 1) and benzothiazolylsulfeneamide base vulcanization accelerators (patent document 2) obtained by using amines originating in natural fats and oils as raw materials are known as sulfeneamide base vulcanization accelerators other than DCBS described above.

However, only rubber physical properties are described with respect to the sulfeneamide base vulcanization accelerators described in the patent documents 1 and 2, and the adhesion performances are neither described nor suggested therein. In addition thereto, it is neither described nor suggested at all that the sulfeneamide compound of the present invention can be used as a novel vulcanization accelerator for rubbers.

Further, several production processes for the sulfeneamide compounds used in the present invention are known in, for example, patent documents 3, 4 and 5, but it is neither described nor suggested at all that the above compounds can be used as a novel vulcanization accelerator for rubbers, and an adhesion performance with a steel cord which is brought by the above vulcanization accelerators is neither described nor suggested therein as well.

Patent document 1: Japanese Patent Application Laid-Open No. 139082/2005
Patent document 2: Japanese Patent Application Laid-Open No. 139239/2005
Patent document 3: EP0314663A1
Patent document 4: British Patent No. 1177790
Patent document 5: Japanese Examined Patent Application Publication Sho 48 No. 11214

DISCLOSURE OF THE INVENTION

Problems to be Solved by the Invention

In light of the conventional problems described above, the present inventors have tried to solve them, and an object of the present invention is to provide a rubber composition which is remarkably reduced in generation of rubber burning by using a vulcanization accelerator having a vulcanization retarding effect which is equal to or higher than that of DCBS without using a vulcanization retardant which is likely to bring about problems such as deterioration in the physical properties, blooming of vulcanized rubber and the like and to provide a rubber composition which is excellent in an adhesive property with metal such as a steel cord.

Means for Solving the Problems

Intensive studies on the conventional problems described above repeated by the present inventors have resulted in finding that the targeted rubber composition described above can be obtained by using a specific sulfeneamide base vulcanization accelerator, and thus the present invention has come to be completed.

That is, the present invention comprises the following items (1) to (9).

(1) A rubber composition comprising a rubber component, sulfur and a sulfeneamide base vulcanization accelerator represented by Formula (I):

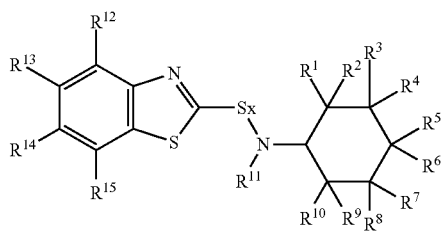

(wherein $R^1$ to $R^{10}$ are a hydrogen atom, a linear alkyl group having 1 to 4 carbon atoms or a branched alkyl group having 3 to 4 carbon atoms, and they may be the same or different; $R^{11}$ is a hydrogen atom, a linear alkyl group having 1 to 10 carbon atoms or a branched alkyl group having 3 to 10 carbon atoms; $R^{12}$ to $R^{15}$ are a hydrogen atom, a linear alkyl group or alkoxy group having 1 to 4 carbon atoms or a branched alkyl group or alkoxy group having 3 to 4 carbon atoms, and they may be the same or different; and x represents an integer of 1 or 2).

(2) The rubber composition as described in the above item (1), comprising 0.1 to 10 parts by mass of the sulfeneamide base vulcanization accelerator represented by Formula (I) based on 100 parts by mass of the rubber component.

(3) The rubber composition as described in the above item (1), comprising 0.3 to 10 parts by mass of sulfur based on 100 parts by mass of the rubber component.

(4) The rubber composition as described in the above item (1), comprising 0.3 to 10 parts by mass of sulfur and 0.1 to 10 parts by mass of the sulfeneamide base vulcanization accelerator represented by Formula (I) based on 100 parts by mass of the rubber component.

(5) The rubber composition as described in the above item (1), further comprising cobalt and/or a compound containing cobalt.

(6) The rubber composition as described in the above item (5), wherein a content of cobalt and/or the compound containing cobalt is 0.03 to 3 parts by mass in terms of a cobalt amount based on 100 parts by mass of the rubber component.

(7) The rubber composition as described in the above item (5) or (6), wherein the compound containing cobalt is a cobalt salt of organic acid.

(8) The rubber composition as described in any one of the above items (1) to (7), wherein the rubber component contains at least one of natural rubber and polyisoprene rubber.

(9) The rubber composition as described in any one of the above items (1) to (7), wherein the rubber component comprises 50% by mass or more of natural rubber and the balance of diene base synthetic rubbers.

Effects of the Inventions

According to the present invention, obtained is a rubber composition containing a novel vulcanization accelerator suited for rubber and has a vulcanization retarding effect which is equal to or higher than that of N,N-dicyclohexyl-2-benzothiazolylsulfeneamide known as a vulcanization accelerator providing vulcanization reaction with the largest delayed action among sulfeneamide base vulcanization accelerators, wherein it is excellent in adhesion durability with metal reinforcing materials such as steel cords which are used for rubber products such as tires, industrial belts, and it is remarkably reduced in generation of rubber burning.

BEST MODE FOR CARRYING OUT THE INVENTION

The embodiments of the present invention shall be explained below in detail.

The rubber composition of the present invention is characterized by comprising a rubber component, sulfur and a sulfeneamide base vulcanization accelerator represented by the following Formula (I):

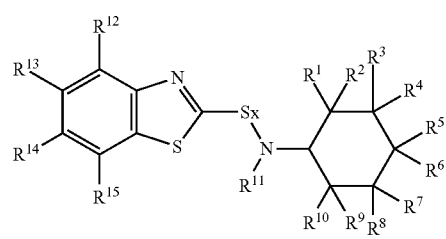

(wherein $R^1$ to $R^{10}$ are a hydrogen atom, a linear alkyl group having 1 to 4 carbon atoms or a branched alkyl group having 3 to 4 carbon atoms, and they may be the same or different; $R^{11}$ is a hydrogen atom, a linear alkyl group having 1 to 10 carbon atoms or a branched alkyl group having 3 to 10 carbon atoms; $R^{12}$ to $R^{15}$ are a hydrogen atom, a linear alkyl group or alkoxy group having 1 to 4 carbon atoms or a branched alkyl group or alkoxy group having 3 to 4 carbon atoms, and they may be the same or different; and x represents an integer of 1 or 2).

The rubber component used in the present invention shall not specifically be restricted as long as it is rubber used for rubber products such as tires, industrial belts, and if it is a rubber component having a double bond in a principal chain, it can be cross-linked by sulfur. Accordingly, the sulfeneamide base vulcanization accelerator represented by Formula (I) described above functions for it, and natural rubber and/or diene base synthetic rubbers are used. Capable of being used is, to be specific, at least one of natural rubber, polyisoprene rubber, styrene-butadiene copolymers, polybutadiene rubber, ethylene-propylene-diene copolymers, chloroprene rubber, halogenated butyl rubber, acrylonitrile-butadiene rubber and the like.

At least one of natural rubber and polyisoprene rubber is preferably contained from the viewpoint of an adhesive property with metal reinforcing materials such as steel cords. Further, the rubber component comprises more preferably 50% by mass or more of natural rubber and the balance at least one of the diene base synthetic rubbers described above from the viewpoint of durability of the belt rubber.

The sulfeneamide base vulcanization accelerator represented by Formula (I) described above according to the present invention has not so far been reported to be used as a vulcanization accelerator, and it is the first time in the present invention that the above sulfeneamide base vulcanization accelerator is used as a vulcanization accelerator. Though it has a larger vulcanization retarding effect than that of N,N-dicyclohexyl-2-benzothiazolylsulfeneamide which is known as a vulcanization accelerator providing vulcanization reaction with the largest delayed action among conventional sulfeneamide base vulcanization accelerators, it has a sufficiently high vulcanization accelerating performance which is consistent with the above effect. In addition thereto, it is excellent in adhesion durability in a direct vulcanization bonding with metal reinforcing materials such as steel cords.

Accordingly, it can suitably be used for rubber products having a large thickness and rubber compositions for coating which are excellent in adhesion durability in a direct vulcanization bonding with metal reinforcing materials such as steel cords.

In the present invention, $R^1$ to $R^{10}$ in the sulfeneamide compound represented by Formula (I) described above represent a hydrogen atom, a linear alkyl group having 1 to 4 carbon atoms or a branched alkyl group having 3 to 4 carbon atoms, and they may be the same as or different from each other. If above $R^1$ to $R^{10}$ are a hydrogen atom, a linear alkyl group having 1 to 4 carbon atoms or a branched alkyl group having 3 to 4 carbon atoms, the compound represented by Formula (I) is provided with a good vulcanization accelerating performance and can be enhanced in an adhesion performance.

The specific examples of a linear alkyl group having 1 to 4 carbon atoms or a branched alkyl group having 3 to 4 carbon atoms of $R^1$ to $R^{10}$ in the compound represented by Formula (I) described above include methyl, ethyl, n-propyl, isopropyl, n-butyl, isobutyl, sec-butyl, tert-butyl group and the like.

Among them, $R^1$, $R^2$, $R^9$ and $R^{10}$ are preferably a hydrogen atom, a linear alkyl group having 1 to 4 carbon atoms or a branched alkyl group having 3 to 4 carbon atoms, and $R^3$ to $R^8$ are preferably a hydrogen atom in terms of such an effect that the sufficiently long scorch time is obtained. Further preferably, $R^1$, $R^2$, $R^9$ and $R^{10}$ are a branched alkyl group having 3 to 4 carbon atoms.

$R^{11}$ in the sulfeneamide compound represented by Formula (I) described above represents a hydrogen atom, a linear alkyl group having 1 to 10 carbon atoms or a branched alkyl group having 3 to 10 carbon atoms. If above $R^{11}$ is a linear alkyl group having 1 to 10 carbon atoms or a branched alkyl group having 3 to 10 carbon atoms, the compound represented by Formula (I) is provided with a good vulcanization accelerating performance and can be enhanced in an adhesion performance.

The specific examples of $R^{11}$ in the compound represented by Formula (I) include methyl, ethyl, n-propyl, isopropyl, n-butyl, isobutyl, sec-butyl, tert-butyl, n-amyl (n-pentyl), isoamyl (isopentyl), neopentyl, tert-amyl (tert-pentyl), n-hexyl, isohexyl, n-heptyl, isoheptyl, n-octyl, iso-octyl, nonyl, isononyl, decyl group and the like. Among them, it is preferably a hydrogen atom, a linear alkyl group having 1 to 8 carbon atoms or a branched alkyl group having 3 to 8 carbon atoms, more preferably a linear alkyl group having 1 to 5 carbon atoms or a branched alkyl group having 3 to 5 carbon atoms from the viewpoint of the effects such as easiness of the synthesis and the costs of the raw materials, and it is particularly preferably a hydrogen atom, methyl, ethyl, n-propyl, i-propyl, n-butyl, sec-butyl or tert-butyl group.

$R^{12}$ to $R^{15}$ in the sulfeneamide compound represented by Formula (I) described above are a hydrogen atom, a linear alkyl group or alkoxy group having 1 to 4 carbon atoms or a branched alkyl group or alkoxy group having 3 to 4 carbon atoms, and they may be the same or different. Among them, $R^{12}$ and $R^{14}$ are preferably a linear alkyl group or alkoxy group having 1 to 4 carbon atoms or a branched alkyl group or alkoxy group having 3 to 4 carbon atoms. When $R^{12}$ to $R^{15}$ are an alkyl group or alkoxy group having 1 to 4 carbon atoms, they have preferably 1 carbon atom, and they are particularly preferably a hydrogen atom. It is because in any preferred cases, the compound is liable to be synthesized and is not delayed in a vulcanization rate.

The specific examples of $R^{12}$ to $R^{15}$ in the compound represented by Formula (I) include methyl, ethyl, n-propyl, iso-propyl, n-butyl, isobutyl, sec-butyl, tert-butyl, methoxy, ethoxy, n-propoxy, isopropoxy, n-butoxy, isobutoxy, sec-butoxy and tert-butoxy group.

Further, the term x in the sulfeneamide compound represented by Formula (I) described above represents an integer of 1 or 2.

In a case where $R^1$ to $R^{10}$ in the sulfeneamide compound represented by Formula (I) are functional groups (for example, n-octadecyl group and the like) other than a hydrogen atom, a linear alkyl group having 1 to 4 carbon atoms or a branched alkyl group having 3 to 4 carbon atoms or a linear or branched alkyl group having carbon atoms exceeding 5 and a case where $R^2$ is a functional group (for example, n-octadecyl and the like) other than a hydrogen atom, a linear alkyl group having 1 to 10 carbon atoms or a branched alkyl group having 3 to 10 carbon atoms or a linear or branched alkyl group having carbon atoms exceeding 10, the aimed effects which are the purpose of the present invention are less exerted, and the Mooney scorch time is shortened; accordingly, burning is liable to be brought about, and the processability is reduced, or the adhesive property is deteriorated or the vulcanization performance and the rubber properties are deteriorated. Further, x of 3 or more is not preferred in terms of the stability.

In the present invention, the representative examples of the compound represented by Formula (I) described above include N-methylcyclohexyl-2-benzothiazolylsulfeneamide, N-ethyl-N-(2,6-dimethylcyclohexyl)-2-benzothiazolylsulfeneamide, N-ethyl-N-(2,6-diisopropylcyclohexyl)-2-benzothiazolylsulfeneamide and the like. The above compounds can be used alone or in a mixture of two or more kinds thereof (hereinafter referred to "at least one kind").

N-methylcyclohexyl-2-benzothiazolylsulfeneamide, N-ethyl-N-(2,6-dimethylcyclohexyl)-2-benzothiazolylsulfeneamide and N-ethyl-N-(2,6-diisopropylcyclohexyl)-2-benzothiazolylsulfeneamide are preferably used from the viewpoint of further adhesion performances.

Further, they can be used in combination with general purpose vulcanization accelerators such as N-tert-butyl-2-benzothiazolylsulfeneamide (TBBS), N-cyclohexyl-2-benzothiazolylsulfeneamide (CBS), dibenzothiazolyl disulfide (MBTS) and the like.

The following process can be listed as the preferred production process for the sulfeneamide compound represented by Formula (I) according to the present invention.

That is, N-chloroamine prepared in advance by reacting corresponding amine with sodium hypochlorite is reacted with bis(benzothiazole-2-yl) disulfide in a suitable solvent under the presence of an amine and a base. When an amine is used as the base, the reaction solution is neutralized to isolate the free amine, and then suitable after-treatments such as filtering, washing with water, concentration, recrystallization and the like are carried out according to the properties of the resulting reaction mixture, whereby the targeted sulfeneamide is obtained.

The base used in the present production process includes a raw material amine used in an excess amount, tertiary amines such as triethylamine, alkali hydroxides, alkali carbonates, alkali bicarbonates, sodium alkoxides and the like. In particular, preferred is a process in which an excess of the raw material amine is used as a base or triethylamine of tertiary amine is used to carry out the reaction and then the resulting a salt of hydrochloride is neutralized by sodium hydroxide to obtain the targeted compound, followed by recovering the amine from the filtrate and reusing it.

The solvent used in the present production process is preferably alcohol, particularly preferably methanol.

In the case of, for example, N-methylcyclohexyl-2-benzothiazolylsulfeneamide, a sodium hypochlorite aqueous solution is dropwise added to N-methylcyclohexylamine at 0° C. or lower and stirred for 2 hours, and then the oil layer is separated. Bis(benzothiazole-2-yl) disulfide, N-methylcyclohexylamine and the oil layer described above are suspended in methanol and stirred for 2 hours under refluxing. After cooling, the solution is neutralized by sodium hydroxide, filtered, washed with water and concentrated under reduced pressure, and then the concentrate is recrystallized, whereby the targeted compound described above can be obtained.

A content of the above sulfeneamide base vulcanization accelerators is 0.1 to 10 parts by mass, preferably 0.5 to 5.0 parts by mass and more preferably 0.8 to 2.5 parts by mass based on 100 parts by mass of the rubber component.

If a content of the above vulcanization accelerator is less than 0.1 part by mass, the vulcanization does not sufficiently proceed. On the other hand, if it exceeds 10 parts by mass, the problem of blooming is brought about, and therefore both ranges are not preferred.

Sulfur used in the present invention is a vulcanizing agent, and a content thereof is 0.3 to 10 parts by mass, preferably 1.0 to 7.0 parts by mass and more preferably 3.0 to 7.0 parts by mass based on 100 parts by mass of the rubber component.

If a content of the above sulfur is less than 0.3 part by mass, the vulcanization is not sufficiently exerted, and on the other hand, if it exceeds 10 parts by mass, an aging resistant performance of the rubber is deteriorated, so that it is not preferred.

Further, cobalt (elemental substance) and/or a compound containing cobalt are preferably added to the rubber composition of the present invention from the viewpoint of enhancing an initial adhesion performance.

The compound containing cobalt which can be used includes at least one of cobalt salts of organic acids and cobalt salts of inorganic acids such as cobalt chloride, cobalt sulfate, cobalt nitrate, cobalt phosphate and cobalt chromate.

The cobalt salts of organic acids are preferably used from the viewpoint of further enhancing the initial adhesion performance.

Capable of being listed as the cobalt salts of organic acids which can be used is at least one of, for example, cobalt naphthenate, cobalt stearate, cobalt neodecanoate, cobalt rhodinate, cobalt versatate, a cobalt salt of tall oil acid and the like. Also, a salt of organic acid may be a composite salt obtained by substituting a part of the organic acid with boric acid, and to be specific, a commercially available product of a trade name "Manobond" manufactured by OMG Co., Ltd. can be used as well.

A (total) content of the above cobalt and/or the compound containing cobalt is 0.03 to 3 parts by mass, preferably 0.03 to 1 part by mass and more preferably 0.05 to 0.7 part by mass in terms of a cobalt amount based on 100 parts by mass of the rubber component.

If a content of cobalt is less than 0.03 part by mass, the adhesive property can not be further exhibited. On the other hand, if it exceeds 3 parts by mass, the aging resistant physical properties are deteriorated to a large extent, and therefore it is not preferred.

In addition to the rubber component, sulfur, the vulcanization accelerator and the cobalt compound each described above, compounding ingredients usually used for rubber products such as tires, conveyor belts and the like can be used for the rubber composition of the present invention as long as the effects of the present invention are not damaged. For example, an inorganic filler such as carbon black, silica and the like, a softener, an age resister and the like can suitably be compounded according to the uses.

The rubber composition of the present invention can be produced by kneading the respective components described above by, for example, a Banbury mixer, a kneader and the like, and it can suitably be used for treads of tires for passenger cars, trucks, buses, two-wheel vehicles and the like, rubber products having a large thickness such as hoses, belt conveyors and rubber products in which rubbers are subjected to direct vulcanization bonding with metals.

The rubber composition of the present invention can suitably be applied to rubber products to which strength is particularly required such as tires for automobiles, conveyor belts, hoses, to be specific, rubber-metal composite materials obtained by covering metal-reinforced materials such as steel cords with rubber compositions for the purpose of reinforcing rubber to enhance strength and durability.

The rubber composition of the present invention thus constituted contains a novel vulcanization accelerator having a vulcanization retarding effect which is equal to or higher than that of N,N-dicyclohexyl-2-benzothiazolylsulfeneamide known as a vulcanization accelerator providing vulcanization reaction with the largest delayed action among sulfeneamide base vulcanization accelerators, and therefore a rubber composition which is excellent in adhesion durability with metal reinforcing materials such as steel cords is obtained without using a vulcanization retardant which is likely to bring about problems such as reduction in the physical properties, blooming of vulcanized rubber and the like.

EXAMPLES

Next, the present invention shall be explained in further detail with reference to production examples for the vulcanization accelerators of the present invention, examples for the rubber compositions of the present invention and comparative examples, but the present invention shall by no means be restricted to the production examples and the examples described below.

Production Example 1

Synthesis of N-methylcyclohexyl-2-benzothiazolylsulfeneamide

A 12% sodium hypochlorite aqueous solution 148 g was dropwise added to N-methylcyclohexylamine 18.3 g (0.162 mol) at 0° C. or lower and stirred for 2 hours, and then the oil layer was separated. Bis(benzothiazole-2-yl) disulfide 39.8 g (0.120 mol), N-methylcyclohexylamine 27.1 g (0.240 mol) and the above oil layer were suspended in 120 ml of methanol and stirred under refluxing for 2 hours. After cooling, the solution was neutralized by sodium hydroxide 6.6 g (0.166 mol), filtered, washed with water and concentrated under reduced pressure, and then the concentrate was recrystallized, whereby targeted N-methylcyclohexyl-2-benzothiazolylsulfeneamide was obtained in the form of a white solid.

Production Example 2

Synthesis of N-ethyl-N-(2,6-dimethylcyclohexyl)-2-benzothiazolylsulfeneamide

The same procedure as in Production Example 1 was carried out to obtain N-ethyl-N-(2,6-dimethylcyclohexyl)-2-benzothiazolylsulfeneamide in the form of a white solid, except that N-dimethylcyclohexylamine 25.1 g (0.162 mol) and 37.2 g (0.24 mol) was used in place of N-methylcyclohexylamine.

Production Example 3

Synthesis of N-ethyl-N-(2,6-diisopropylcyclohexyl)-2-benzothiazolylsulfeneamide

The same procedure as in Production Example 1 was carried out to obtain N-ethyl-N-(2,6-diisopropylcyclohexyl)-2-benzothiazolylsulfeneamide in the form of a white solid matter, except that N-diisopropylcyclohexylethylamine 34.2 g (0.162 mol) and 50.7 g (0.24 mol) was used in place of N-methylcyclohexylamine.

Examples 1 to 3 and Comparative Examples 1 to 2

The vulcanization accelerators obtained in the production examples described above were used to knead rubber compositions having blending formulations shown in the following Table 1 by an ordinary method.

The respective rubber compositions obtained were used to measure a Mooney viscosity and a Mooney scorch time which are physical properties of the unvulcanized one by the following methods and evaluate the workability.

Further, the respective rubber compositions obtained were used to carry out an adhesion test by the following method.

The results thereof are shown in the following Table 1.

Evaluation Methods of Mooney Viscosity and Mooney Scorch Time:

Evaluated According to JIS K 6300-1: 2001.

In the evaluations, the values were shown by indices, wherein the values obtained in Comparative Example 1 were set to 100. In the case of the Mooney viscosity, the smaller value shows that the workability is better, and in the case of the Mooney scorch time, the larger value shows that the workability is better.

Adhesion Test Method:

Three steel cords (diameter 0.5 mm×length 300 mm) plated with brass (Cu: 63 wt %, Zn: 37 wt %) were arranged parallel at an interval of 10 mm, and these steel cords were coated with the respective rubber compositions from both upper and lower sides and vulcanized under the conditions of 160° C. and 20 minutes to prepare samples.

The adhesive properties of the respective samples thus obtained were evaluated according to ASTM-D-2229, wherein the steel cords were draw out from the respective samples to visually observe the covering states of the rubbers, and they were shown by 0 to 100% as an index for the adhesive property. In the case of the heat resistant adhesive property, after the respective samples were left standing in a gear oven at 100° C. for 15 and 30 days, the steel cords were draw out from them according to the test method described above to visually observe the covering states of the rubbers, and they were shown by 0 to 100% as an index for the heat resistant adhesive property. The larger numerical value shows that the heat resistant adhesive property is excellent.

TABLE 1

(blending unit: parts by mass)

| | Example | | | Comparative Example | |
|---|---|---|---|---|---|
| | 1 | 2 | 3 | 1 | 2 |
| Natural rubber | 100 | 100 | 100 | 100 | 100 |
| HAF carbon black | 60 | 60 | 60 | 60 | 60 |
| Zinc oxide | 8 | 8 | 8 | 8 | 8 |
| Age resister *1 | 2 | 2 | 2 | 2 | 2 |
| Vulcanization accelerator *2 | — | — | — | 1 | — |
| Vulcanization accelerator *3 | — | — | — | — | 1 |
| Sulfur | 5 | 5 | 5 | 5 | 5 |
| Cobalt salt of fatty acid *4 | 1 | 1 | 1 | 1 | 1 |
| Novel vulcanization accelerator *5 | 1 | — | — | — | — |
| Novel vulcanization accelerator *6 | — | 1 | — | — | — |
| Novel vulcanization accelerator *7 | — | — | 1 | — | — |
| Mooney viscosity ($ML_{1+4}$) | 100 | 100 | 100 | 100 | 100 |
| Mooney scorch time ($t_3$) | 110 | 115 | 120 | 100 | 70 |
| Heat resistant adhesive property (%) in 15 days | 80 | 80 | 80 | 70 | 60 |
| deterioration in 30 days | 45 | 50 | 55 | 40 | 20 |

*1: N-phenyl-N'-1,3-dimethylbutyl-p-phenylenediamine (trade name: Nocceler 6C, manufactured by Ouchi Shinko Chemical Industrial Co., Ltd.)
*2: N,N-dicyclohexyl-2-benzothiazolylsulfeneamide (trade name: Nocceler DZ, manufactured by Ouchi Shinko Chemical Industrial Co., Ltd.)
*3: N-cyclohexyl-2-benzothiazolylsulfeneamide
*4: trade name: Manobond C22.5, cobalt content: 22.5% by mass, manufactured by OMG Co., Ltd.
*5: N-methylcyclohexyl-2-benzothiazolylsulfeneamide

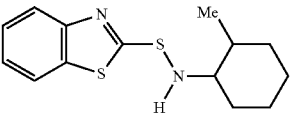 [SMILES: CC1CCCCC1NSc1nc2ccccc2s1]

*6: N-ethyl-N-(2,6-dimethylcyclohexyl)-2-benzothiazolylsulfeneamide

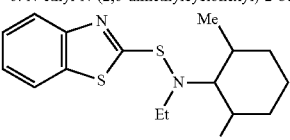

*7: N-ethyl-N-(2,6-diisopropylcyclohexyl)-2-benzothiazolylsulfeneamide

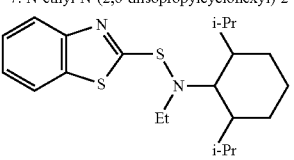

As apparent from the results shown in Table 1, it has been found that in Examples 1 to 3 which fall in the scope of the present invention, the workability and the heat resistant adhesive property are excellent as compared with those in Comparative Examples 1 to 2 which fall outside the scope of the present invention.

INDUSTRIAL APPLICABILITY

The rubber composition of the present invention can suitably be applied to treads of tires for passenger cars, trucks, buses, two-wheel vehicles and the like, rubber products having a large thickness such as hoses, belt conveyors and rubber products in which rubber is subjected to direct vulcanization bonding with metals.

The invention claimed is:

1. A rubber-metal composite material obtained by covering a metal reinforcing material with a rubber composition, characterized in that the rubber composition comprises a rubber component, sulfur and a sulfeneamide base vulcanization accelerator represented by Formula (I):

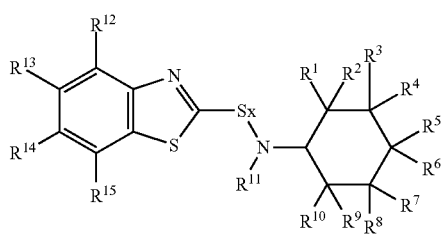

(wherein $R^1$ to $R^{10}$ are a hydrogen atom, a linear alkyl group having 1 to 4 carbon atoms or a branched alkyl group having 3 to 4 carbon atoms, and they may be the same or different; $R^{11}$ is a hydrogen atom, a linear alkyl group having 1 to 10 carbon atoms or a branched alkyl group having 3 to 10 carbon atoms; $R^1$ to $R^{11}$ are not all a hydrogen atom at the same time; $R^{12}$ to $R^{15}$ are a hydrogen atom, a linear alkyl group or alkoxy group having 1 to 4 carbon atoms or a branched alkyl group or alkoxy group having 3 to 4 carbon atoms, and they may be the same or different; and x represents an integer of 1 or 2).

2. The rubber-metal composite material as described in claim 1, wherein the rubber composition comprises 0.1 to 10 parts by mass of the sulfeneamide base vulcanization accelerator represented by Formula (I) based on 100 parts by mass of the rubber component.

3. The rubber-metal composite material as described in claim 1, wherein the rubber composition comprises 0.3 to 10 parts by mass of sulfur based on 100 parts by mass of the rubber component.

4. The rubber-metal composite material as described in claim 1, wherein the rubber composition comprises 0.3 to 10 parts by mass of sulfur and 0.1 to 10 parts by mass of the sulfeneamide base vulcanization accelerator represented by Formula (I) based on 100 parts by mass of the rubber component.

5. The rubber-metal composite material as described in claim 1, wherein the rubber composition further comprises cobalt and/or a compound containing cobalt.

6. The rubber-metal composite material as described in claim 5, wherein a content of cobalt and/or the compound containing cobalt in the rubber composition is 0.03 to 3 parts by mass in terms of a cobalt amount based on 100 parts by mass of the rubber component.

7. The rubber-metal composite material as described in claim 5, wherein the compound containing cobalt in the rubber composition is a cobalt salt of organic acid.

8. The rubber-metal composite material as described in claim 1, wherein the rubber component contains at least one of natural rubber and polyisoprene rubber.

9. The rubber-metal composite material as described in claim 1, wherein the rubber component comprises 50% by mass or more of natural rubber and the balance of diene base synthetic rubbers.

* * * * *